United States Patent [19]

Senn

[11] 3,988,183

[45] Oct. 26, 1976

[54] VARIATION OF BINDER CONTENT IN THE CORE LAYER

[75] Inventor: Siegfried Senn, Zurich, Switzerland

[73] Assignee: Fahrni Institute Ltd., Zurich, Switzerland

[22] Filed: Nov. 10, 1970

[21] Appl. No.: 88,519

[30] Foreign Application Priority Data

Nov. 24, 1969 Switzerland ....................... 17434/69

[52] U.S. Cl. .............................. 156/62.8; 156/62.2; 264/113; 264/128; 428/212; 428/332; 428/357

[51] Int. Cl.[2] ......................... B29J 5/02; B32B 5/16

[58] Field of Search .......................... 156/62.2, 62.8; 161/162, 166, 168, 165; 264/113, 128

[56] References Cited

UNITED STATES PATENTS

| | | | |
|---|---|---|---|
| 2,686,143 | 8/1954 | Fahrni | 156/62.8 |
| 3,021,244 | 2/1962 | Meiler | 156/62.2 |
| 3,383,274 | 5/1968 | Craig | 161/168 X |
| 3,391,233 | 7/1968 | Polovtseff | 156/62.2 X |

OTHER PUBLICATIONS

Weiner, Jack, "Particle Board" No. 210 suppl. 1, abstract 394.

Halligan, A. F., "Review of Recent Glues and Gluing Research Applied to Particle Board Manufacture" Forest Prod. J. 19 No. 1:44–51 (Jan. 1969).

*Primary Examiner*—George F. Lesmes
*Assistant Examiner*—P. Thibodeau
*Attorney, Agent, or Firm*—Anthony J. Casella

[57] ABSTRACT

Particleboard, i.e., wood chip panels having greater transverse strength in that the core layer is characterized by having a central zone therein with a greater amount of binder on the chips in said central zone, based on the total weight of the wood chips in the respective zones, than on the chips in the intermediate zones adjacent the face zones of said core layer.

10 Claims, No Drawings

VARIATION OF BINDER CONTENT IN THE CORE LAYER

Variation of binder content in the core layer for the production of one or multilayer panels by compression of particles mixed with a binder. Particleboard i.e., wood chip panels having greater transverse strength in the core layer is characterized by having a central zone with a greater amount of binder, based on the total weight of the wood chips in the respective zones, than intermediate zones adjacent its face zones.

The subject of the present invention is a method for the production of one and multilayer panels by compression of particles mixed with a binder, particularly by hot pressing wood chips mixed with a thermosetting binder. Furthermore the invention comprises a panel produced according to the invention. The invention concerns particularly wood chip panels, namely those with a core layer of coarser wood chips and one or several top layers of finer wood chips of the type sold under the trademark "Novoply" (Trademark of Champion International Corporation) and made under the Fahrni U.S. Pat. Nos. 2,642,371, 2,686,143, 2,688,306, 2,696,330, and others, all beneficially owned by the assignee of this application. All of the above patents are by reference incorporated herein in their entirety.

It has been known for many years that breaks caused by transverse stresses appear generally in the range of the center plane of the panel, particularly in wood chip or particleboard panels. The reason possibly lies in the somewhat lower density of the chips in the central core zone proper of the core layer; that is, of those particles which are close to the center plane of the panel. However, no practical conclusions have been drawn so far from these past experiences.

This invention is based on the finding that the production of panels of the above mentioned type can be made more economical by a meaningful differentiation of the binder content over the cross section of the panel. The method according to the invention is realized on the basis of this finding by adding to the particles provided for the formation on the innermost core of the panel a larger amount of binder, relative to its weight, than to those particles which are provided for the formation of the intermediate zones arranged at both sides of this central core zone between the latter and the surface zones of the panel.

Due to the fact that the binder content in the innermost core zone of the panel is higher than the binder content in the adjacent intermediate zones, it is possible to produce a panel where the total binder content and hence cost is lower than that of a conventional panel with the same transverse tensile stress.

The invention also concerns a panel produced according to the above defined method, which consists of a core layer of coarser wood chips and of one or several intermediate layers of finer wood chips. In this panel the new feature according to the invention is that the core layer is composed of three superposed zones of which the two outer zones are identical and have the same binder content. In addition, the binder content of the innermost core zone is higher than that of the two outer core layer zones, i.e., intermediate zones.

It should be noted that the terms "core zone" and "core layer" do not have the same meaning. By core layer we understand in a panel everything that is between the top or outside layers. This applies both to three- or other multilayer panels proper, and to so-called one-layer panels. In the latter the zones close to the surface are also normally more compressed than the inner part, due to the direct action of the press plates, so that we can speak here also of the top layers. But by the term core zone in a one or multilayer panel we understand that part of the core layer which is arranged in the immediate proximity of the center plane of the panel.

With particular advantage the binder portions of the above mentioned zone of the core layer are so selected that the transverse tensile strength of the core layer is at least substantially constant over its entire cross section. This is frequently the case when the three above mentioned zones have at least approximately the same thickness.

The teaching according to the invention reduces the binder portion of a panel without impairing its properties. On the other hand, the transverse tensile strength is also improved by increasing merely the binder content of the innermost core zone, that is, the central part of the core layer, compared to that of the intermediate zones, i.e., outer core layer zones.

The method according to the invention, as well as the product obtained with this method, will now be described more fully on the basis of an embodiment. For example to produce a three layer wood chip panel with a mean volumetric weight of 600 kg./cu.m. and a thickness of 20 mm., the top layer chips have a mean thickness of about 0.2 mm. Furthermore a mixture of irregular oblong chips with a length of about 5–50 mm., and a mean thickness of about 0.4–0.7 mm., is used for the core layer.

For the production of a single square meter there is required 1.285 kg. top layer chips per layer (weight of absolutely dry wood) which have, e.g., a moisture content of 15% (related to absolutely dry wood). These chips are so glued with a liquid urea formaldehyde resin that the chips absorb 155 g. solid binder, and the total water portion is about 30% (related to absolutely dry wood).

The core layer of the panel is composed of three zones or plies of identical core chips, the chip portion for these three zones being equal. The innermost of the three zones, namely the core zone proper, is arranged between two zones called the intermediate zones. Each of the three zones requires per square meter 2.6 kg. core layer chips with a moisture content of about 3% (related to absolutely dry wood). The chips provided for the core zone are to be covered with a liquid urea formaldehyde resin which is so diluted that the chips have a moisture content of about 9% after gluing. But the chips provided for the so-called intermediate zones are only covered with 115 g. solid of a somewhat more diluted urea formaldehyde resin per zone, so that the total moisture content of these chips assumes a value of about 9% of the weight of dry wood.

By means of a special spreading machine a layer of top layer chips is at first uniformly spread out. Then a somewhat thicker intermediate zone of weakly glued core chips, compared to the top zone, is applied, for example, by means of a second distributor. This intermediate zone serves as a base for the core zone proper, consisting of strongly glued core chips. Over this inner zone proper is again applied an intermediate zone of weakly glued core chips. Finally the whole structure is covered with a zone of top layer chips of the above described type.

The chip panel blank thus formed is now pressed between two press plates heated to about 150° C. at a conventional maximum pressure of approximately 15 kg./sq.m. and consolidated to a three layer panel whose core layer is not homogeneous in so far as the binder content of the middle zone is higher than that of the two adjacent intermediate zones.

It was found that breaks caused by transverse stresses appear in a panel produced according to the above method more or less statistically distributed over the entire cross section of the core layer. With the same breaking strength, we achieve considerable savings in the amount of binder, compared to a panel with homogeneous binder distribution in the core layer.

Naturally the core layer can also be divided into more than three zones. Thus, for example a core layer of five superposed zones is practical where the binder content in the zones 1 and 5 can be about 4%, in the zones 2 and 4 about 5%, for example, and in the innermost zone 3 about 6% for example. In large plants or in the production of very thick panels where the core layer is formed by the superposition of a large number of zones, the differentation of the binder in the core layer could be even finer graded. Besides, it is advisable in certain cases to make the core layer zones, differing in their binder content, of different thickness; for example, in a blank with five core layer zones in this way that the zones 1, 2, 4, and 5 have a uniform percentage of a binder, which is lower than the binder portion zone 3.

Thus a superior panel is produced by using a greater amount of binder in the core zone as compared to the amount of binder used in the intermediate zones based on total weight of wood chips. If a 5-layer core is manufactured, it is preferred that the outer layers have less binder than the central layer or zones. The amount of binder a resin utilized may vary depending upon a number of factors, such as chip size, type of resin, and other factors. However, if a 3 layer core be used it is preferred that the core zone contain about 3% to 7% or 8% such about 5% by weight of binder based on the weight of wood chips. If a 5-layer core be used it is preferred that the outermost zones contain about 2% to 6% such about 4%, by weight, of binder. Generally the core zone should contain about 1% to 3% such as 2% more binder than the amount of binder in the intermediate layers. Also if a five layer core be used the intermediate zone should contain about 1% to 3% such as 2% more binder than the outermost layers. Another satisfactory panel in accordance with the present invention is one wherein the amount of resin in the intermediate zones is about 3% to 8%, the amount of resin in said core zone always being about 1% to 2% greater than the amount of resin in said intermediate zones.

The embodiments of the invention in which an exclusive property or privilege is claimed are defined as follows:

1. Method for the production of single layer or multilayer panels which comprises preparing a core zone of wood chips mixed with a thermosetting binder, superimposing on both sides of said core zone intermediate zones of wood chips mixed with quantities of said binder, the amount of binder in said core zone being greater than the amount of binder in said intermediate zones based on the weight of said chips in the respective zones, and wherein outer core zones of wood chips and binder are superimposed along said intermediate zones, and wherein the amount of binder used in said outer core zones is less than the amount used in said intermediate zones based on the weight of the wood chips, the amount of binder, by weight, used in said core zone is about 4% to 8%, wherein the amount of binder used in said intermediate zones is about 3% to 7%, wherein the amount of binder used in said outer core zones is about 2% to 6%, and wherein the amount of binder in said core zone is always about 1% to 2% greater than the amount of binder in said intermediate zones, and wherein the amount of binder in said intermediate zones is always about 1% to 2% greater than the amount of binder in said outer core zones, and thereafter hot pressing said zones to produce a high quality panel.

2. Method as defined by claim 1 wherein adhesive coated top layer chips are uniformly spread out and applied to each outer zone of wood chips and binder and thereafter hot pressing to form a unitary consolidated board.

3. Process for the preparation of a multilayer wood chip panel of improved transverse tensile strength which comprises uniformly spreading a lower surface zone of chips and binder, then uniformly spreading a lower intermediate zone of chips and binder on said surface zone, then uniformly spreading a core zone of chips and binder on said lower intermediate zone, then uniformly spreading an upper intermediate zone of chips and binder on said core zone and then uniformly spreading an upper surface zone of chips and binder on said upper intermediate zone, using in said core zone wood chips having lengths of about 5 to 50 mm and mean thicknesses of about 0.4 to 0.7 mm and about 4% to 8% by weight of binder based on the wood chips, using in said intermediate zones wood chips having a mean thickness of about 0.2 mm and about 3% to 7% by weight of binder based on the wood chips, the amount of binder added to the core zone chips always being at least 1% greater than the amount of binder added to the intermediate zone chips, and thereafter pressing at a temperature of about 150° C at a pressure of about 15 $kg/m^2$.

4. Process as defined by claim 3 wherein the amount of binder added with said surface zone chips is 1% to 3% less than the amount of binder added to said intermediate zone chips.

5. Method as defined by claim 4 wherein an outer zone layer of wood chips and binder is uniformly spread out between each surface zone and said core zones to form five core zones.

6. Method as defined by claim 4 wherein an outer zone layer of wood chips and binder is uniformly spread out between each of said surface zones of chips and binder and said intermediate zones of chips and binder whereby to form a panel of seven zones.

7. Method for the production of a multilayer panel consisting of a core layer of five superimposed zones which comprises uniformly spreading a first zone of chips containing about 4% by weight of binder, superimposing a second zone of chips containing about 5% by weight of binder, superimposing a third core zone of chips containing about 6% by weight of binder, superimposing a fourth zone of chips containing about 5% by weight of binder, superimposing a fifth zone of chips containing about 4% by weight of binder and thereafter pressing.

8. Method as defined by claim 7 wherein said pressing is at a temperature of about 150° C at a pressure of about 15 $kg/m^2$.

9. Method as defined by claim 8 wherein an adhesive coated surface layer of wood chips is spread out and bonded to said core layers forming the first zone and fifth zone of chips.

10. Method for the production of homogenous or nonhomogenous chipboards which comprises mixing core layer chips with a relatively small quantity of a thermosetting binder and mixing core zone chips with a greater amount of thermosetting binder with respect to the weight of the chips, forming a particle blank by spreading five core layers, the chips forming the core zone having more thermosetting binder thereon than the adjacent core layers, and adjacent core layers having more binder thereon than the outer layers of said core, the binder content applied to said core zone being approximately 6% by weight, approximately 5% of said intermediate core layer, and approximately 4% for said outer core layer, and thereafter hot pressing said blank to produce a chipboard having a higher binder concentration in its core zone than in the adjacent layers.

* * * * *